United States Patent Office 3,140,069
Patented July 7, 1964

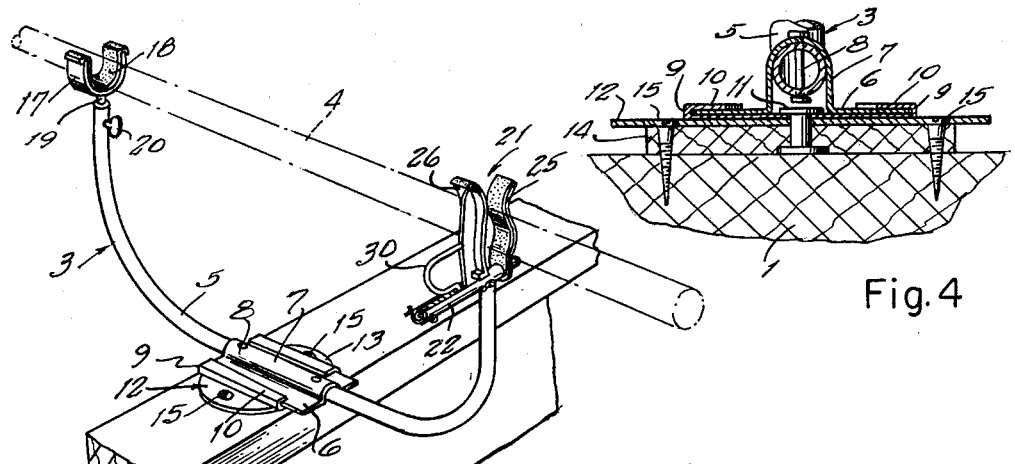
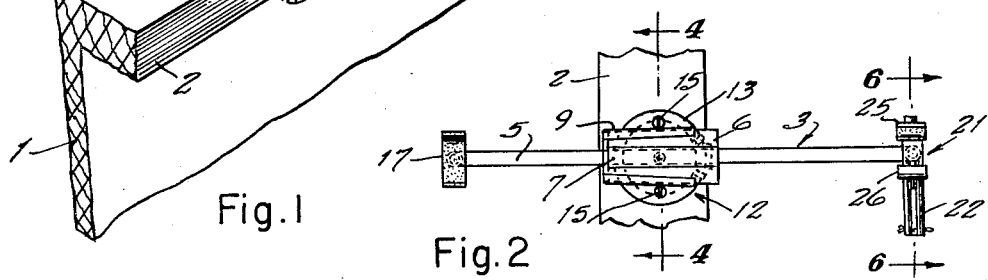
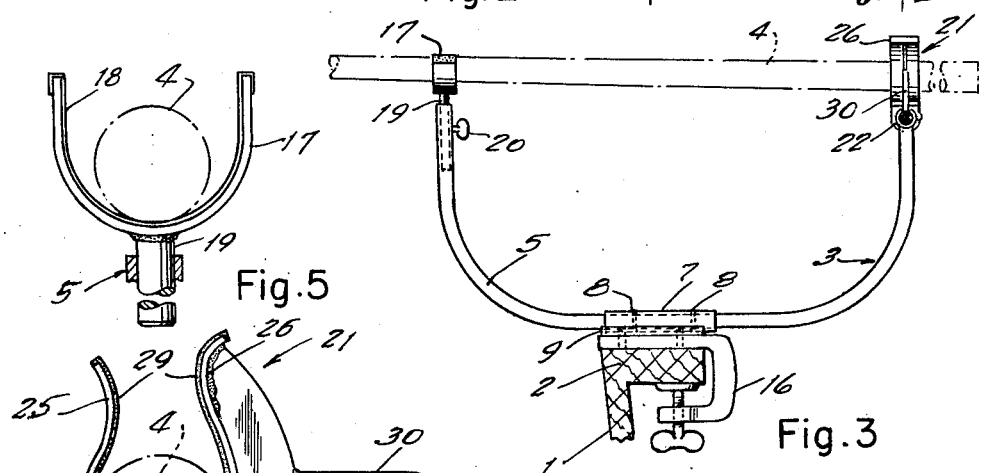
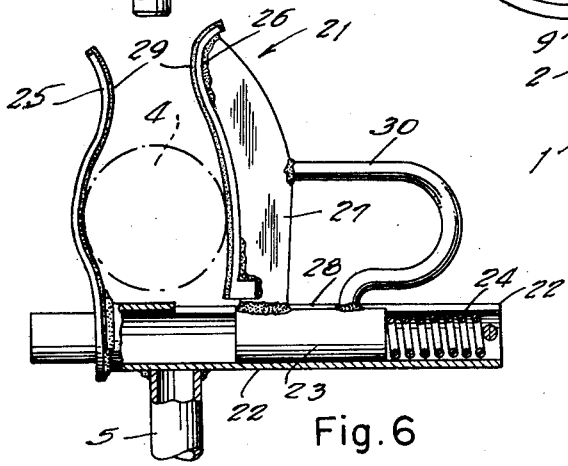
July 7, 1964 — F. M. McBURNEY ETAL — 3,140,069
FISHING POLE HOLDER
Filed June 1, 1962
Faye M. McBurney
Elmer E. Moore
INVENTORS
ATTORNEY

3,140,069
FISHING POLE HOLDER
Faye M. McBurney, Box 217, Cresson, Tex., and Elmer
E. Moore, 424 Athenia Lane, Fort Worth, Tex.
Filed June 1, 1962, Ser. No. 199,418
2 Claims. (Cl. 248—40)

This invention relates to a holder for a fishing rod, and it concerns more particularly a holder for attachment to a gunwale of a boat whereby a fishing rod may be removably and adjustably supported on the side of the boat in any desired position relative thereto.

The invention contemplates a holder whereby a fishing rod may be conveniently supported unattended on one side of a boat, while at the same time being instantly releasable from the holder when it is desired to hold the rod in the hand, as in securing a fish after it has been hooked.

The invention further contemplates a holder having means for removably and adjustably supporting a fishing rod on one side of a boat whereby the fishing rod is adjustable pivotally in both horizontal and vertical planes, and having means for removably securing the holder to either side of the boat, as desired.

The invention will be readily understood by referring to the following description and the accompanying drawing, in which:

FIGURE 1 is a perspective view showing fragmentarily one side of a boat having a holder embodying the invention secured thereto, and showing in dotted lines a fishing rod operatively positioned in the holder;

FIGURE 2 is a top plan view of the holder shown in FIGURE 1, showing fragmentarily the side of the boat to which the holder is secured;

FIGURE 3 is a side elevational view showing a holder having different means for securing it to the side of the boat, which is shown fragmentarily;

FIGURE 4 is a fragmentary sectional elevational view on an enlarged scale, taken on the line 4—4 of FIGURE 2, showing in detail the means illustrated in FIGURES 1 and 2 whereby the holder is secured to one side of the boat;

FIGURE 5 is a fragmentary end elevational view on an enlarged scale, showing in detail the cradle whereby one end of a fishing rod, shown in dotted lines, is supported, as illustrated in FIGURES 1 and 2; and FIGURE 6 is a fragmentary sectional elevational view on an enlarged scale, taken on the line 6—6 of FIGURE 2, showing in detail the cradle and spring tensioned clamp whereby the end of the fishing rod, shown in dotted lines, opposite the end shown in FIGURE 5 is removably secured.

Referring to the drawing, the numeral 1 designates generally one side of a boat, shown fragmentarily in perspective in FIGURES 1 to 4, having a gunwale 2, and the numeral 3 indicates generally a holder embodying the invention, as hereinafter described, which advantageously may be secured to the gunwale 2 in the manner illustrated in FIGURES 1, 2, and 4, or alternatively, as shown in FIGURE 3.

A fishing rod, designated generally by the numeral 4, is shown fragmentarily in dotted lines, in FIGURES 1, 3, 5, and 6, operatively positioned in the holder 3 in one of its adjusted positions relative to the side of the boat 1.

The holder 3 includes an elongated tubular member 5, which advantageously may be formed of light weight metal such as aluminum. The tubular member 5 is bowed intermediate its ends, as shown in FIGURES 1 and 3, and has a horizontally extending intermediate portion, which is secured to the gunwale 2 as hereinafter described, and upwardly extending opposite end portions.

The tubular member 5 is connected intermediate its ends to a substantially wedge shaped slide element 6, which consists of a flat plate having converging side edges and having an arched central portion 7 which is fitted over the intermediate portion of the tubular member 5 and is secured thereto by rivets 8, or other suitable device.

The wedge shaped slide element 6 is received in a correspondingly shaped socket member 9, which consists of a flat plate having converging sides and having upstanding side flanges 10 which are folded over the adjacent side edges of the slide element 6 in the assembled position of the slide element 6 relative to the socket member 9, as shown best in FIGURE 4.

As shown in FIGURES 1, 2, and 4, the socket member 9 is pivotally connected, by a rivet 11, to a circular base 12 which consists of a metal plate 13 supported on a spacer block 14, the plate 13 and the block 14 being removably connected to the gunwale 2 by screws 15.

The socket member 9 is adjustable rotatively relative to the circular base 12 by pivotal movement thereof about the rivet 11.

In a modified structure, as shown in FIGURE 3, the socket member 9 is connected to a conventional C clamp, indicated generally by the numeral 16, whereby it is removably secured to the gunwale 2 for rotative adjustment relative thereto.

As shown best in FIGURE 5, a cradle 17, which is padded as at 18, is connected to the upper end of a pin 19 which is received in one of the upstanding end portions of the tubular member 5 and is adjustably secured, for vertical adjustment relative thereto, by a set screw 20. In FIGURE 6, a cradle 21 is shown secured to the other of the upstanding end portions of the tubular member 5.

The cradle 21 is formed in part by a cylinder 22, which is arranged transversely of the tubular member 5 and is rigidly connected intermediate its ends to the adjacent end thereof. The cylinder 22 has a plunger 23 movable reciprocally therein, the plunger 23 being biased in the direction of one end of the cylinder 22 by a compression spring 24. The cradle 21 further includes a fixed side member 25, which is rigidly connected to the cylinder 22, and a movable side member 26, which is rigidly connected to an upstanding plate 27 which in turn extends through a longitudinal slot 28 in the cylinder 22 and is rigidly connected to the plunger 23. The side members 25, 26 are padded as at 29.

The fishing rod 4 is supported in the cradles 17 and 21, as shown in FIGURES 1, 3, 5, and 6. A bent wire handle 30 is connected at its ends to the plunger 23 and the upstanding plate 27 whereby the plunger 23 may be retracted against the resistance of the spring 24 whereby the fishing rod 4 may be received in or disengaged from the cradle 21.

The invention may be modified in various ways without departing from the spirit and scope thereof.

What is claimed is:
1. In combination with a boat having a gunwale, the combination of a fishing rod holder comprising an elongated tubular member, bowed intermediate its ends, having a horizontally extending intermediate portion and upstanding end portions, cradle means on opposite ends of the tubular member engageable with a fishing rod, means removably connecting the tubular member intermediate its ends to the gunwale for rotative adjustment about a vertical axis relative thereto, the cradle means on one end of the tubular member being secured to a pin which is received in said one end of the tubular member and is secured therein, for vertical adjustment relative thereto, by a set screw, and the cradle means on the opposite end of the tubular member being formed in part by a cylinder arranged transversely of the tubular mem- ber and rigidly secured intermediate its ends to the adjacent end thereof, the cylinder having a spring biased plunger therein, said last mentioned cradle means further including a fixed side member on the cylinder and a movable side member connected to the plunger and movable therewith, and having handle means whereby the plunger may be retracted against the resistance of the spring.

2. The structure of claim 1, the means removably connecting the tubular member intermediate its ends to the gunwale consisting essentially of a wedge shaped slide element rigidly connected to the tubular member and a correspondingly shaped socket member having the slide element received therein, the socket member having means removably connecting it to the gunwale for rotative adjustment about a vertical axis relative thereto.

References Cited in the file of this patent
UNITED STATES PATENTS

| | | |
|---|---|---|
| 2,561,046 | Brooks | July 17, 1951 |
| 2,628,795 | Diderrich | Feb. 17, 1953 |
| 2,680,588 | Wright | June 8, 1954 |
| 2,973,930 | Smith | Mar. 7, 1961 |